United States Patent

[11] 3,624,134

[72] Inventor Mahmoud S. Kablaoui
Wappingers Falls, N.Y.
[21] Appl. No. 15,297
[22] Filed Feb. 27, 1970
[45] Patented Nov. 30, 1971
[73] Assignee Texaco Inc.
New York, N.Y.

[54] PREPARATION OF ALKYLATED BENZENE ACETATE
5 Claims, No Drawings
[52] U.S. Cl.................................................. 260/479 R,
260/624 R
[51] Int. Cl..................................................... C07c 69/14
[50] Field of Search.......................................... 260/479 R

[56] References Cited
OTHER REFERENCES
Doering et al., J. Am. Chem. Soc, Vol. 71, pgs. 2221– 6 (1949)

*Primary Examiner*—James A. Patten
*Attorneys*—Thomas H. Whaley, Carl G. Ries and Robert A. Kulason ABSTRACT: A method of preparing an alkylated benzene compound of the formula:

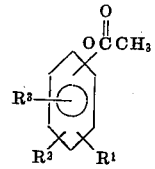

where $R^2$ and $R^3$ are alkyl of from one to 20 carbons and $R^1$ is hydrogen or alkyl of from one to 20 carbons comprising contacting a gem polyalkylated cyclohexenone of the general formula:

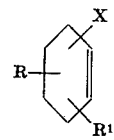

where R is said $R^2$ and $R^3$ is gem position to one another, $R^1$ is as heretofore defined, X is keto oxygen, with a mixture of concentrated sulfuric acid and acetic anhydride.

PREPARATION OF ALKYLATED BENZENE ACETATE

BACKGROUND OF INVENTION

This invention relates to the preparation of polyalkylated benzene acetates which can be converted by standard hydrolysis techniques to corresponding polyalkylated phenols. The polyalkylated phenols find use as antioxidants for rubber (natural and synthetic), polymers, diesel fuels and gasolines. In the past, aromatization of polyalkylated cyclohexenone was accomplished by a two-step process of bromination followed by dehydrobromination of chlorination followed by dehydrochlorination or by thermal dehydrogenation or via one-step process wherein the gem polyalkylated cyclohexeneone is contacted for a period of 10 days with 30 percent oleum. The latter method requires exhaustive steam distillation in order to desulfonate the resultant product and prepare a phenolic type derivative. Although the prior methods aromatize and rearrange the alkyl groups, they fail to produce an acetate product which is readily converted into commercial derivatives such as alkylated hydroxybenzenes. Further, they require highly toxic materials such as bromine, chlorine, oleum and/or have long reaction times even for less than satisfactory yields.

DESCRIPTION OF THE INVENTION

I have discovered and this constitutes my invention a single step method of directly aromatizing and rearranging the alkyl stricture of a gem polyalkyl cyclohexanone in a single step in substantially improved yields and without the need of extended reaction times or the employment of materials which require extraordinary handling procedures such as oleum, chlorine or bromine. Further, the nongem acetate derivative product formed in the method of the invention is readily converted with negligible loss in yield by established hydrolysis techniques to the commercially attractive polyalkylated phenols.

More specifically, the invention comprises the preparation of polyalkylated benzene acetate of the general formula:

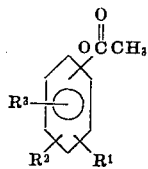

where $R^1$ is hydrogen or alkyl of from one to 20 carbons and $R^2$ and $R^3$ are alkyl of from one to 20 carbons comprising contacting a gem polyalkylated cyclohexenone of the general formula:

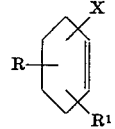

where $R^1$ is as heretofore defined, R is said $R^2$ and $R^3$ in gem position to one another whose mutual carbon is adjacent to an unsubstituted ring carbon and X is keto oxygen with a mixture of acetic anhydride and concentrated sulfuric acid in a mole ratio or said acetic anhydride to said cyclohexenone of at least about 1:1 and up to 100:1 or more, preferably between about 5:1 and 20:1, and a mole ratio of said sulfuric acid to said cyclohexenone of at least about 0.05:1 and up to 10:1 or more, preferably at between about 0.5 and 1.5, at a temperature between about 30° and 500°C., preferably between about 80° and 150°C., normally for a period of between about 0.5 and 4 hours. Superatmospheric pressure is contemplated when the reaction is conducted above the boiling point of one or more of the reaction ingredients. At the end of the reaction period the nongem polyalkylated acetate is recovered by standard techniques.

Under the most preferred conditions, the aromatization, acylation, rearrangement reaction combination can be conducted using excess acetic anhydride as the diluent medium which accounts for those contemplated mole ratios of acetic anhydride to cyclohexenone reactant in substantial excess of 1:1. Other diluent solvents may be employed such as acetic acid, xylene, toluene, benzene, heptane, hexane, chloroform, carbon tetrachloride, chlorobenzenes and cyclohexane. The solvent diluent amounts employed are advantageously between about 20 and 80 wt. percent basis the reaction mixture.

Further, under preferred conditions, the reaction is conducted in an inert atmosphere such as nitrogen utilizing agitation to facilitate ingredient contact.

One established means of isolating the benzene acetate products is accomplished by distilling off the diluent byproduct, and unreacted acetic anhydride followed by quenching the residue in between about 2 and 100 volumes water per volumes residue and extracting out the benzene acetate product with a water immiscible volatilizable solvent therefor such as ether, benzene and chloroform.

The individual isomeric acetate products are separated from one another by standard fractional distillation, crystallization and/or combination thereof.

As heretofore stated the alkylated benzene monoacetate products can be converted into corresponding phenols by established hydrolysis techniques. One means comprises contacting the acetate product with a dilute aqueous acid, e.g., between about 2 and 30 wt. percent aq. HCl at a temperature between about 30°C., thereby converting the acetate to the corresponding phenol. Subsequently, the formed aromatic hydroxy compound is extracted from the hydrolysis compound mixture and purified by the same techniques as described heretofore in respect to the acetate recovery and purification.

One of the material features of the method of invention is if other mineral acids such as hydrochloric or phosphoric acid are substituted for the sulfuric acid and/or materials closely related to acetic anhydride such as acetic acid are substituted for acetic anhydride, no aromatization and/or dialkyl or rearrangement takes place. Further, no aromatization or rearrangement takes place unless the gem ring carbon in the ketone reaction is adjacent to an unsubstituted ring carbon.

Hereinbefore and hereinafter by the term "concentrated sulfuric acid" an acid consisting of between 95 and 100 wt. percent $H_2SO_4$ and between 0 and 5 percent water is intended.

Examples of the gem polyalkylated cyclohexenones contemplated herein are 3,5,5-trimethylcyclohex-2-enone; 5,5-dimethylcyclohex-2-enone; 4,4-dibutylcyclohex-2-enone and 4-decyl-6,6-dipropylcyclohex-3enone. Corresponding acetate products derived therefrom are 2,3,5-trimethylbenzene acetate, 2,3-dimethylbenzene acetate, 3,4-dibutylbenzene acetate and 2-decyl-3,4-dipropylbenzene acetate. The corresponding hydroxy compounds are 2,3,5-trimethylphenol, 2,3-dimethylphenol, 3,4-dibutylphenol and 2-decyl-3,4-dipropylphenol.

The following examples illustrate the invention but are not to be construed as limitations thereof.

EXAMPLE I

This example illustrates the method of the invention utilizing the mole ratio of ketone reactant to sulfuric acid of about 1:1.

To a 300 mls. 3-necked flask equipped with a magnetic stirrer, condenser, gas sparger and thermometer, there were charged 10 grams of 3,5,5-trimethylcyclohex-2-enone and 150 mls. of acetic anhydride. The mixture was cooled to about 10°–15C. and 7.2 grams of concentrated (96 wt. percent) sulfuric acid was added slowly to maintain the temperature range. After addition was complete the mixture was refluxed for 1 hour at a temperature of 140° C. during which time dry nitrogen was bubbled at a rate of 140 mls. per minute. The resultant reaction mixture was then subjected to fractional distillation to remove excess acetic anhydride and the residue was worked up to recover 2,3,5-trimethylbenzene acetate and 3,4,5-trimethylbenzene acetate in a yield of 90 wt. percent and in a component ratio of 1:3. The workup was as follows:

The reaction residue was cooled and quenched in 200 mls. of ice water, extracted with 200 mls. of ether, the ether layer was washed with 100 mls. of 7 wt. percent aqueous sodium bicarbonate and dried. Upon distillation of the washed ether layer a residue resulted which was identified as the trimethylbenzene acetate.

The recovered trimethylbenzene acetate was then contacted with 100 mls. of 15 wt. percent aqueous hydrochloric acid and refluxed at 100° C. for 3 hours and the resultant aqueous solution was extracted with 200 mls. of ether and the ether extract subjected to distillation to remove said ether leaving 8.9 grams of residue which was determined to be trimethylphenol in a yield of 90 wt. percent basis original cyclohexenone reactant. A chromatographic analysis found the residue was 26 wt. percent 2,4,5-trimethylphenol and 74 wt. percent 3,4,5-trimethylphenol.

EXAMPLE II

Example I was repeated except that the amount of sulfuric acid was double, 14.4 grams instead of 7.2. After workup, three compounds were isolated: 2,3,5-trimethylphenyl acetate (20percent), 3,4,5-trimethylphenyl acetate (60percent) and 3,5,6- trimethylcatechol diacetate (20 percent). Upon hydrolysis as in example I, the corresponding hydroxybenzenes were isolated. The yield of the aromatized material in this run amount to about 55 wt. percent basis initial ketone reactant.

EXAMPLE III

Examples I and II were repeated whereby a mixture of acetic acid (75 mls.) and acetic anhydride (75 mls.) were used instead of 150 mls. of acetic anhydride. The same results were obtained.

EXAMPLE IV

Examples I and II were repeated whereby concentrated hydrochloric and phosphoric acids replaced $H_2SO_4$ (Runs A and A'), and acetic anhydride was replaced by acetic acid (Run B). In both Runs A, A' and B no aromatic compounds were isolated.

EXAMPLE V

Examples I and II were repeated whereby the amount of concentrated $H_2SO_4$ was varied from 0.36 gram (mole ratio of acid to ketone of 0.05:1)—Run C to 7.2 grams (mole ratio of acid to ketone 1:1)—Run D, and from 7.2 to 14.4 grams (mole ratio of ketone to acid 1:2)—Run E. In Run F the amount of concentrated $H_2SO_4$ was below 0.36 gram (0.2 gram). In Runs C and D the benzene acetates were isolated with the relative amount of benzene acetate increasing as the ratio of sulfuric acid to reactant ketone increased. In Run E the yield of monoacetate decreased in comparison to Run D. In Run F. only the cyclohexylenol acetate was isolated.

EXAMPLE VI

Example I was repeated except the ketone employed was 2-octyl-5-methyl-3,5-dinonylcyclo-2-enone. There was formed 2-octyl-5-methyl-3,5-dinonylbenzene acetate.

I claim:
1. A method of producing a nongem polyalkylated benzene acetate product of the general formula:

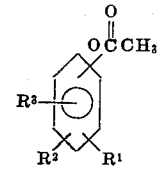

where $R^1$ is hydrogen or alkyl of from one to 20 carbons, $R^2$ and $R^3$ are alkyl of from one to 20 carbons comprising contacting a gem polyalkylated cyclohexenone of the formula:

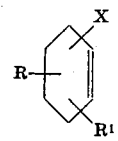

where $R^1$ is as heretofore defined, R is said $R^2$ and $R^3$ in gem position to one another whose mutual ring carbon is adjacent to an unsubstituted ring carbon and X is keto oxygen with a mixture of concentrated sulfuric acid and acetic anhydride at a temperature between about 30° and 500° C. utilizing a first mole ratio of said acetic anhydride to said cyclohexenone of at least about 1:1 and a second mole ratio of said sulfuric acid to said cyclohexenone of at least about 0.05: to form said nongem polyalkylated benzene acetate.

2. A method in accordance with claim 1 wherein said contacting is conducted in the presence of an inert gas.

3. A method in accordance with claim 2 wherein said first ratio is between about 5:1 and 20:1, said second mole ratio is between about 0.5:1 and 1.5:1 and and said temperature is between about 80° and 150° C.

4. A method in accordance with claim 3 wherein said gem polyalkylated cyclohexenone is 3,5,5-trimethylcyclohex-2-enone and said polyalkylated benzene acetate is a mixture of 2,3,5-trimethylbenzene acetate and 3,4,5-trimethylbenzene acetate.

A method in accordance with claim 3 wherein said cyclohexenone is 2-octyl-5-methyl-3,5dinonylcyclohex-2-enone and said benzene acetate is 2-octyl-5-methyl-3,5-dinonylbenzene acetate.